United States Patent [19]

Goughneour

[11] Patent Number: 5,405,173

[45] Date of Patent: Apr. 11, 1995

[54] FLUID CONDUCTING JOINT

[75] Inventor: Richard J. Goughneour, Travelers Rest, S.C.

[73] Assignee: T & S Brass and Bronze Works, Inc., Travelers Rest, S.C.

[21] Appl. No.: 106,830

[22] Filed: Aug. 16, 1993

[51] Int. Cl.⁶ ............................................. F16L 27/00
[52] U.S. Cl. ................... 285/123; 285/168; 285/181; 285/190; 285/272
[58] Field of Search ............... 285/123, 168, 181, 273, 285/274, 190, 139, 272, 130, 94

[56] References Cited

U.S. PATENT DOCUMENTS

| | | | |
|---|---|---|---|
| 403,767 | 5/1889 | Meyer | 285/190 X |
| 814,448 | 3/1906 | Hirth | 285/190 X |
| 871,577 | 11/1907 | Dunkel | 285/123 |
| 1,578,951 | 3/1926 | Bersted | 285/181 X |
| 1,832,435 | 11/1931 | Voorhies et al. | 285/181 X |
| 2,083,970 | 6/1937 | Walter | 285/190 X |
| 2,220,216 | 11/1940 | Cloutier | 285/181 |
| 2,417,494 | 3/1947 | Hoof | 285/190 X |

FOREIGN PATENT DOCUMENTS

| | | | |
|---|---|---|---|
| 1041914 | 10/1953 | France | 285/190 |
| 879827 | 10/1961 | United Kingdom | 285/181 |

Primary Examiner—Randolph A. Reese
Assistant Examiner—Heather Chun Shackelford
Attorney, Agent, or Firm—Dority & Manning

[57] ABSTRACT

A swivel joint connecting articulable fluid conducting arm members of a plumbing assembly includes an inlet member matable with a first arm member and having an inlet fluid passage from the arm member to an inlet collar section. An outlet member is provided matable with a second arm member. The outlet member also defines an outlet fluid passage from the respective second arm member to an outlet member collar section. A fluid conducting shaft member is disposed through the inlet and outlet member collar sections so that the collar sections rotate about the longitudinal axis of the shaft. A bearing sleeve is concentric about the shaft so that the collar sections rotate about the bearing sleeve. Resilient sealing rings are disposed about the shaft adjacent the bearing sleeve so as to prevent leakage of fluid from the swivel joint. Upon axially compressing the sealing rings and the bearing sleeve together, the sealing rings radially expand thereby sealing against the collar sections.

33 Claims, 4 Drawing Sheets

FLUID CONDUCTING JOINT

BACKGROUND OF THE INVENTION

The present invention relates to a fluid conducting joint, and more particularly to a fluid conducting device interposed between two fluid conducting arms such as in a pre-rinse assembly or the like.

There are numerous uses in industry, residential, hospital, etc. environments for a fluid conducting joint which is disposed between two fluid conducting arm members. For example, a common use of such a device is in a pre-rinse assembly commonly used in the food services and hospital environments. An example of such a pre-rinse assembly is the "Nautilus" pre-rinse assembly from T&S Brass and Bronze Works, Inc. of Travelers Rest, S.C. These units consist essentially of articulatable fluid conducting arm members with an attached hose or like device having a spray nozzle. The arm members are joined by swivel joints which are designed to provide the widest possible area coverage while placing minimum stress on the hose or arm members. It is essential to the operation of these devices that the swivel joints connecting the arm members and/or hose and arm member provide for free range of motion between the members while ensuring that fluid does not leak from the joint.

The conventional method of fabricating the swivel joints, however, has proven deficient in that the joints tend to leak over a period of time. This has reduced overall reliability of the pre-rinsing assemblies and, could result in a dangerous condition if the pre-rinse assemblies are conducting relatively hot fluid. Failure of the swivel joints is also relatively expensive in that the entire assembly generally must be disassembled in order to replace the swivel joints.

With the present invention, applicant provides an improved swivel joint for use in any manner of applications, particularly plumbing fixtures and the like. The improved swivel joint has a significantly longer life than its conventional counterpart and greatly improves the reliability of the apparatus in which it is used.

OBJECTS AND SUMMARY OF THE INVENTION

It is a principal object of the present invention to provide an improved fluid conducting swivel joint to be connected between fluid conductive articulable members.

A further object of the invention is to provide an improved pre-rinse assembly having a reliable leak-free swivel joint.

Yet another object of the present invention is to provide an improved and more reliable swivel joint that can be retrofitted into systems employing conventional swivel joints.

Another object of the present invention is to provide a swivel joint wherein the components forming the joint can be readily disassembled and replaced with minimum downtime to the apparatus.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the apparatus of the present invention comprises a device for conducting fluid between variably positional pipe members. The device includes a first member having an inlet portion which is matable with a first pipe member. The first member has a collar section and a fluid passage defined between the inlet portion thereof and the collar section. A second member is provided having an outlet portion matable with a second pipe member. The second member has a collar section and a fluid passage defined between the collar section and the outlet. The first and second member collar sections are disposed relatively adjacent each about a common rotational axis. In other words, the end of the first collar section is adjacent the end of the second collar section. A shaft is also provided disposed through the collar sections. The collar sections are rotatable about the shaft and the shaft further defines a longitudinal channel therethrough having a first opening into the longitudinal channel and a second opening into the longitudinal channel. The device further includes at least one bearing sleeve which is concentric about the shaft and first opening in the shaft. Preferably, at least a second bearing sleeve is also provided concentric about the shaft and second opening therein. The first and second openings in the shaft are in fluid communication with the first and second member fluid passages respectively through the appropriate bearing sleeves. In other words, a continuous fluid channel is defined from the first member fluid passage, through the first bearing sleeve, into the first opening in the shaft, through the longitudinal channel of the shaft, out the second opening of the shaft, through the second bearing sleeve, and out the second member fluid passage. Sealing devices are also provided disposed concentric about the shaft and adjacent to the bearing sleeves. Means are further provided for compressing together the bearing sleeves and the sealing devices so that the bearing sleeves squeeze the sealing devices thereby causing the sealing devices to seal against the collar sections. In this manner, the continuous fluid path just described is defined regardless of the degree of rotation of the first and second members about the shaft.

In a preferred embodiment, the first and second member inlet portions are disposed substantially perpendicular to the first and second member collar sections respectively. However, the disposition of the inlet portions with respect to the collar members can vary depending upon the angular relationship desired between the two components.

In another preferred embodiment of the invention, the inlet and outlet portions are formed integral with the first and second collar sections respectively. In this embodiment, the fluid passages may comprise cross-drilled holes between the inlet and outlet portions and the collar sections. However, the first and second members could also be formed of inter-connected collar sections and inlet/outlet sections.

Preferably the shaft according to the present invention comprises concentric recessed portions defined therearound. In this embodiment, the first and second openings are defined in the recessed portions. In this manner, concentric flow chambers are defined between the recessed portions and the bearing sleeves. In this embodiment, it is also preferred that the bearing sleeves concentric about the recessed portions comprise circumferential fluid ports defined therein. The ports are spaced apart so that the first member fluid passage is in constant fluid communication with the second member fluid passage regardless of the degree of rotation of the first and second members about the shaft. This embodiment may also preferably comprise at least one additional bearing sleeve intermediate the bearing sleeves concentric about the recessed portions of the shaft. In this embodiment, an additional sealing device would be disposed on each side of the intermediate bearing sleeve. Also, in this embodiment, the adjacent ends of the collar sections would be concentric about the intermediate bearing sleeve.

The sealing devices according to the invention preferably comprise resilient O-rings. The O-rings have an uncompressed or unsqueezed outer diameter which is slightly less than the outer diameter of the bearing sleeves. In this manner, upon compressing the bearing sleeves and the O-rings together, the O-rings assume a squeezed outer diameter which is greater than that of the bearing sleeves thereby sealing against the collar sections. Since, in the unsqueezed condition, the outer diameter of the O-rings is less than that of the bearing sleeves, the shaft and bearing sleeve assembly with O-rings can be easily inserted and removed from the collar sections without the O-rings being cut or binding when inserted into the knuckle as they pass over the cross-drilled inlet/outlet holes, as with the old conventional devices.

The means for compressing the O-rings and bearing sleeves together preferably comprises an end cap which is threadedly mated with the shaft. The end cap compresses the bearing sleeves and the sealing devices as it is screwed onto the shaft. Preferably, a second end cap is provided fixedly secured to the shaft opposite the threaded end thereof. This fixedly secured end cap may be formed integral with the shaft.

Preferably, the bearing sleeves are comprised of a friction reducing material, such as an acetal resin comprising teflon. Any suitable thermoplastic material with teflon or the like may be utilized.

To further achieve the objects and in accordance with the purposes of the invention, a rinsing assembly, such as the "Nautilus" pre-rinse assembly by T&S Brass, is provided by the present invention. The assembly includes at least two articulable fluid conducting arm members, with one of the arm members being conductible to a fluid source. A swivel joint is provided conducting the articulable arm members. The swivel joint comprises essentially the device as discussed above.

It is further in accordance with the purposes of the invention to include the improved swivel joint in any manner of plumbing fixtures where it is desired to conduct fluid between two articulable members.

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
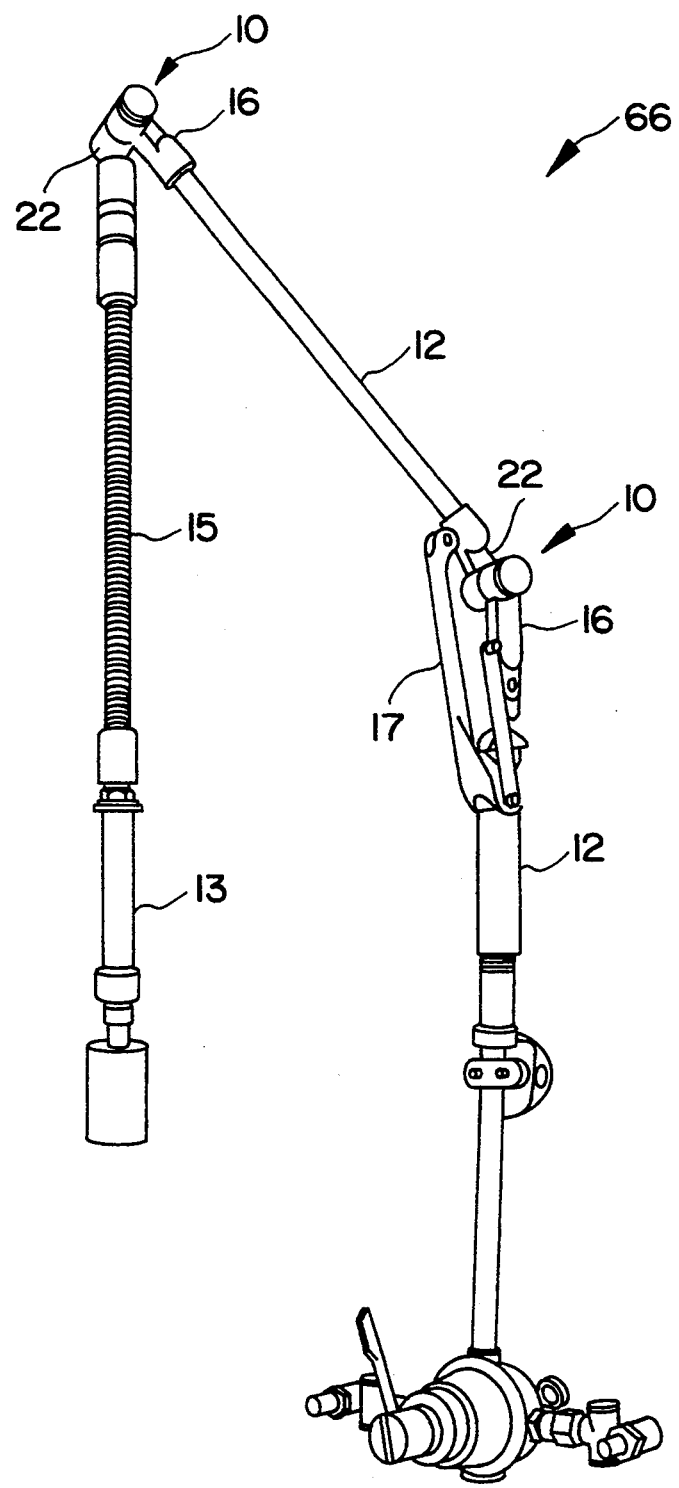
FIG. 1 is a perspective view of a pre-rinse assembly incorporating improved swivel joints according to the invention.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For example, features illustrated or described as part of one embodiment, can be used in another embodiment to yield a still further embodiment. Thus, it is intended that the present invention cover such modifications and variations as come within the scope of the appended claims and their equivalents. The number of components in the drawings is consistent throughout the application, with the same components having the same number in each of the drawings.

Figure 6:
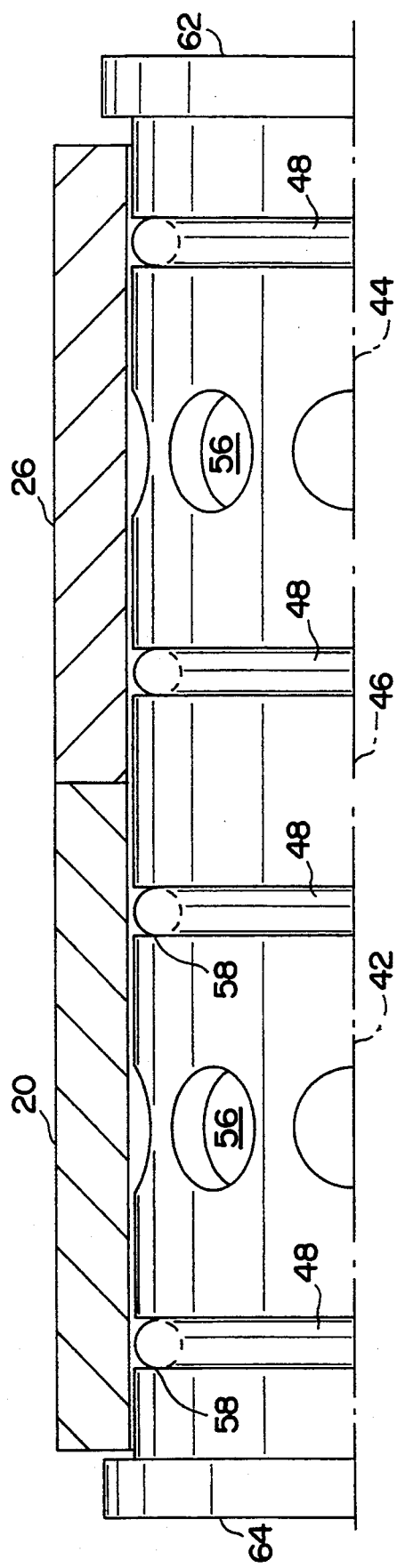
FIG. 6 is a perspective view of the shaft and compression devices of the invention illustrated in an unsqueezed or unstressed state.

Referring to FIG. 1, the present invention comprises an improved swivel joint 10 for use in a fixture 66, such as a conventional pre-rinse assembly. The pre-rinse assembly illustrated in FIG. 6 is but a mere example of an apparatus in which joint 10 could be used. There are countless devices and fixtures in which joint 10 could be employed. The operation of the actual pre-rinse assembly illustrated in FIG. 1 is understood by those in the art and need not be described in great detail herein. In general though, such a device includes articulable pipe members 12. Preferably, at least one of the pipe members 12 is connected to a water or liquid source. In the embodiment of FIG. 1, the upright arm 12 is connected through any conventional valve to a standard water supply. The arms are articulatable relative each other through joint 10. A spring mechanism or loading device 17 is disposed between the arms, as is commonly understood. A third arm 15 or, in this case, a flexible hose, is articulably disposed relative to the second arm 12. Again, a swivel joint 10 is provided between the two arms. A spray nozzle or like device 13 is attached to hose 15. Thus, movement is provided between stationary arm 12 and articulable arm 12, and also between articulable arm 12 and hose 15. These two pivot points provide for a wide range of motion of the spray head 13.

Figure 2:
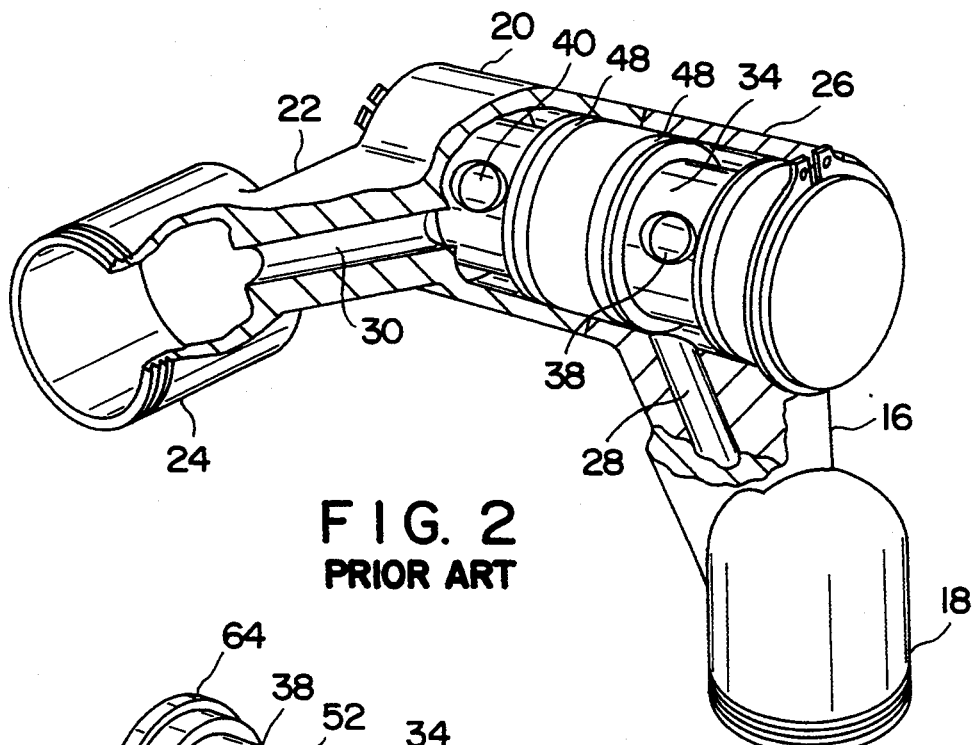
FIG. 2 is a perspective partial cut-away view of a prior art swivel joint.

FIG. 2 illustrates a prior art type of swivel joint. This type of swivel joint has been used, for example, in the pre-rinse assemblies manufactured by T&S Brass. This type of swivel joint includes a first member 16 having an inlet portion 18 and a second member 22 having an outlet portion 24. It should be understood that the inlet and outlet portions are reversible and are merely defined as such for ease of description. The inlet and outlet portions further comprise collar sections 26 and 20. A shaft 34 is disposed within the collar sections 20 and 26.

The shaft includes a longitudinal channel defined therein with a first longitudinal channel opening 38 and a second longitudinal opening 40. First member 16 includes a fluid passage 28 defined between the inlet portion 18 and collar section 26. Likewise, second member 22 includes a fluid passage 30 defined between outlet portion 24 and collar section 20. In this manner, fluid could be conducted from inlet 18 through passage 28, into the longitudinal channel of the shaft through opening 38, out of the longitudinal channel through opening 40, through passage 30 and out outlet portion 24. The members 22 and 16 are rotatable about shaft 34. With this prior art device, O-rings 48 were provided around the shaft on each side of the openings into the longitudinal channel. However, with this device, the O-rings were sized and first placed around the shaft in a stressed or squeezed condition. In other words, the O-rings assumed their squeezed or stressed diameter upon being placed around the shaft. The O-rings were stressed and radially extended beyond the shaft so that when the shaft was inserted into the collar sections, the O-rings had a tendency to be nicked as they passed across cross-drilled passages 28 and 30. This resulted in leakage from the swivel joint. It should be understood that, with the prior art device, the O-rings were stressed or squeezed radially outward due to the fact that their inner diameter was less than the diameter of the shaft portion about which they were disposed. It should also be understood that with the conventional prior art device, there was no bearing interface between the shaft and collar sections. It is preferred to form these elements of brass and, thus, a brass-on-brass interface resulted. This feature further degraded the reliability of the prior art device.

The present invention is illustrated in FIGS. 3 through 7. A device 10 is provided for conducting fluid between variably positional pipe members. Device 10 includes a first member 16 and a second member 22. First member 16 has an inlet portion 18 which is matable with a first pipe member, as discussed. Second section 22 has an outlet portion 24 which is matable with a second pipe member. As shown in the figures, it is preferred that the inlet and outlet portions 18 and 24 are threaded for relatively easy engagement with respective pipe members. However, this is not a limitation and any suitable engagement means may be provided.

Members 16 and 22 also include collar sections 20 and 26. Preferably, the members are formed as integral components so that the collar section 20 and inlet portions 18 are formed as a single integral component. However, the components may also be separate and connectable. The members include fluid passages 28 and 30 defined between the inlet/outlet portions 18 or 24 and the collar sections 20 and 26. In a preferred embodiment, as particularly illustrated in FIG. 4, the inlet or outlet sections 18 or 24 are disposed substantially perpendicular and slightly offset from their respective collar positions. In this embodiment, the passages 28 or 30 are angled between the collar sections and inlet or outlet portions. For ease of manufacture and integrity, passages 28 or 30 are formed by cross-drilling holes between the portions and collar sections. However, any fluid conducting passage would suffice. Thus, fluid flows into inlet portion 18, through passage 28, and into collar section 20. Likewise, fluid flows out of collar section 26, through passage 30, and out outlet portion 24. As mentioned above, it should be understood that the first and second members are reversible in that fluid can flow in either direction through the device.

Device 10 also includes shaft 34 disposed through collar sections 20 and 26. The collar sections 20 and 26 are rotatable about shaft 34. Thus, the collar sections 20 and 26 have adjacent ends which are concentric about shaft 34. Shaft 34 defines a longitudinal channel 36 therethrough having a first opening 38 into channel 36 and a second opening 40 out of channel 36. Shaft 34 may comprise any number of openings 38 and. 40 defined therein but, must include at least one opening 38 in fluid communication with passage 28 and one opening 40 in fluid communication with passage 30.

Figure 3:
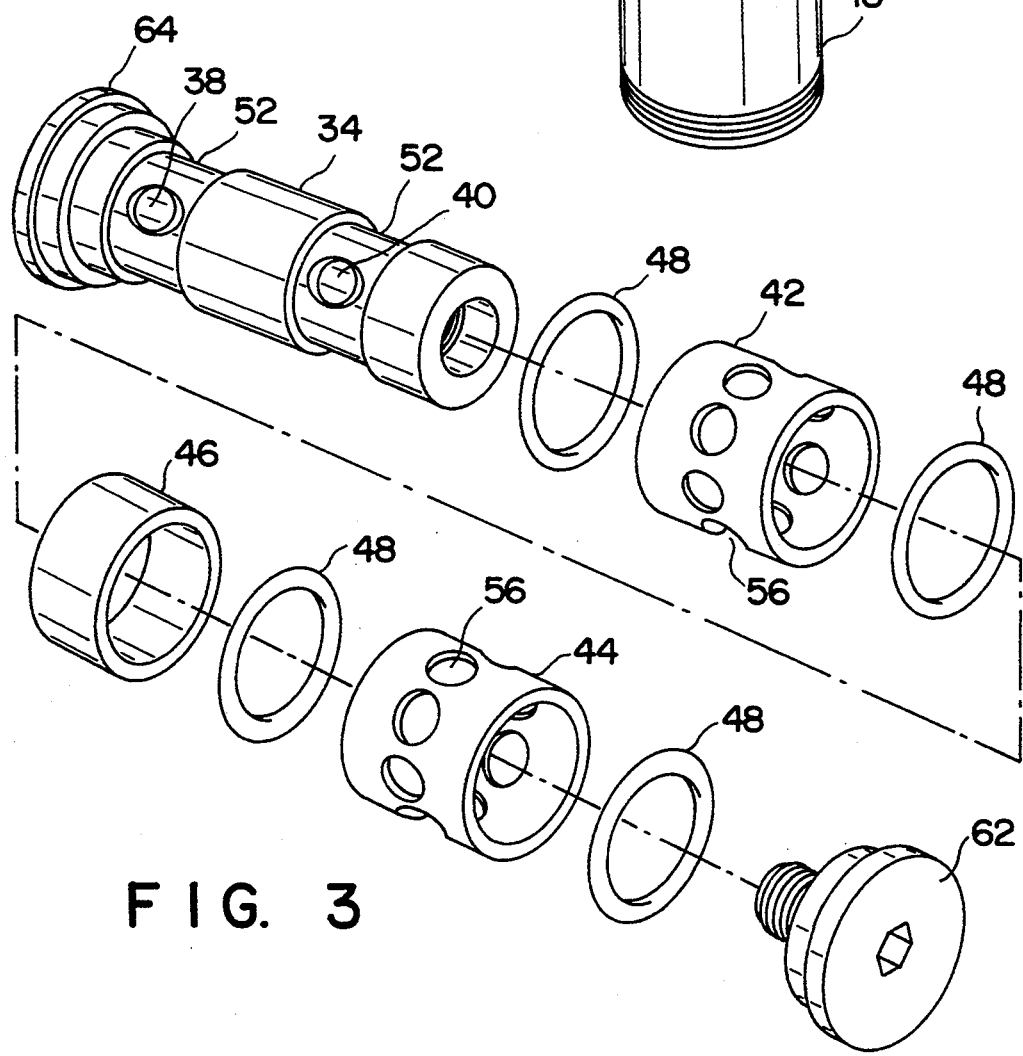
FIG. 3 is an in-line component view of the shaft, sealing devices, bearing members, and end caps according to the invention with the dashed line indicating the assembly order of the components.

As is more clearly illustrated in FIG. 3, shaft 34 preferably comprises concentric recess portions 52 with openings 38 and 40 being defined in the recess portions.

Device 10 also includes at least one bearing sleeve, such as sleeve 42, concentric about shaft 34 so that collar sections 20 and 26 rotate about the bearing sleeve. The bearing sleeve includes fluid ports 56 defined therein so that a continuous fluid passage is defined into and out of longitudinal channel 36 through the bearing sleeve.

In a preferred embodiment, a plurality of bearing sleeves 42, 46, 44 are provided disposed concentric about shaft 34. However, this is a preferred embodiment and not meant as a limitation of the invention. For example, a single bearing sleeve could be provided about shaft 34 having fluid ports 56 defined therein at each end thereof.

Device 10 further includes sealing devices 48 disposed concentric about shaft 34 adjacent to at least the ends of bearing sleeve 42. In the embodiment wherein a plurality of bearing sleeves, such as 42, 44, and 46, are used, bearing devices 48 are disposed at each of the ends of the bearing sleeves.

Device 10 also includes means for compressing together the bearing sleeve and sealing device 48 thereby causing sealing devices 48 to assume a squeezed or stressed outer diameter so as to seal against collar sections 20, 26. In this manner, a continuous fluid path is defined through said first member, through said shaft, and out said second member regardless of the degree of rotation of the first and second members about the shaft without fluid leaking from between the shaft and collar sections.

Figure 4:
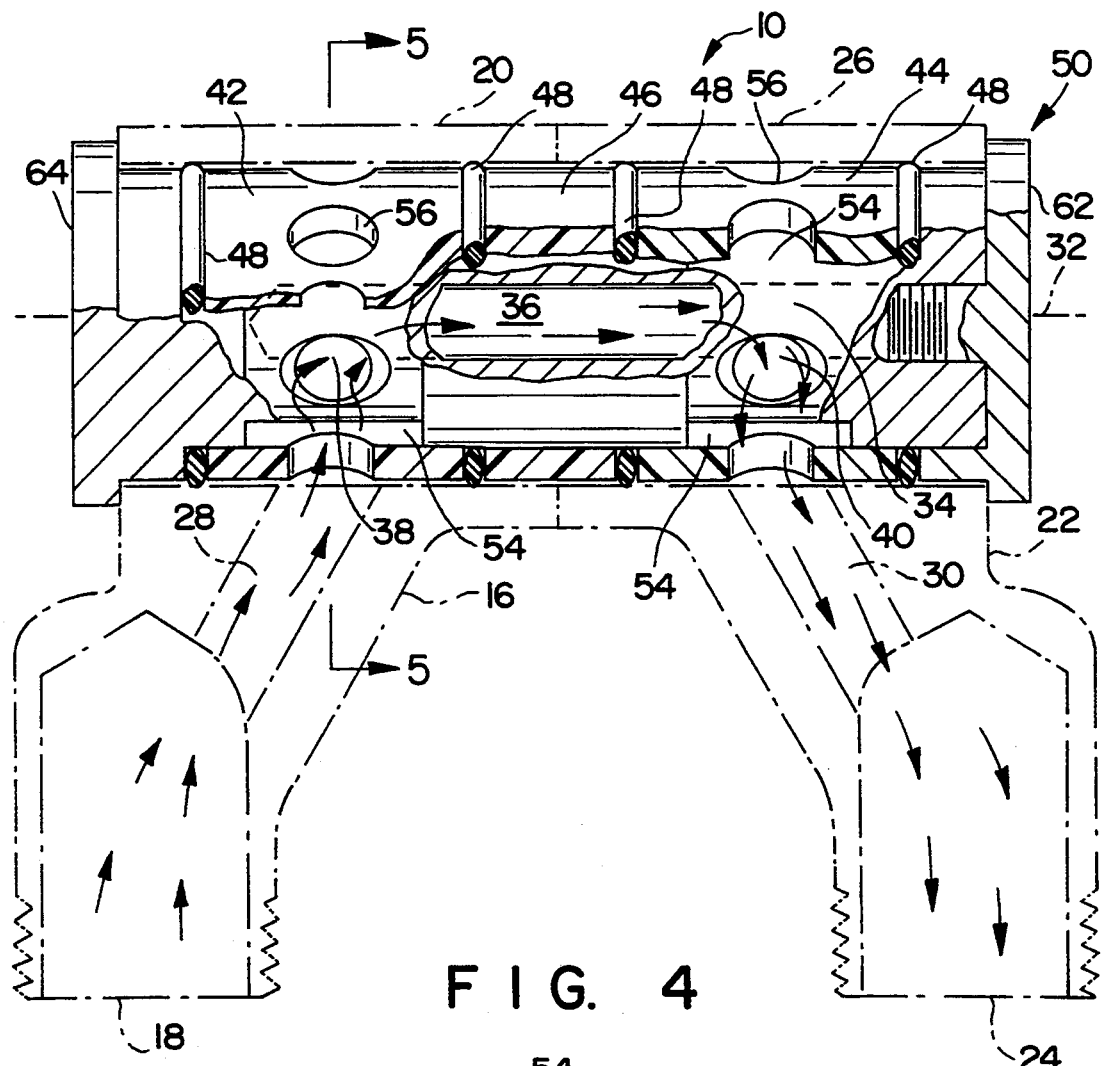
FIG. 4 is a component view of the swivel joint according to the invention shown in various stages of partial cut-away.
Figure 5:
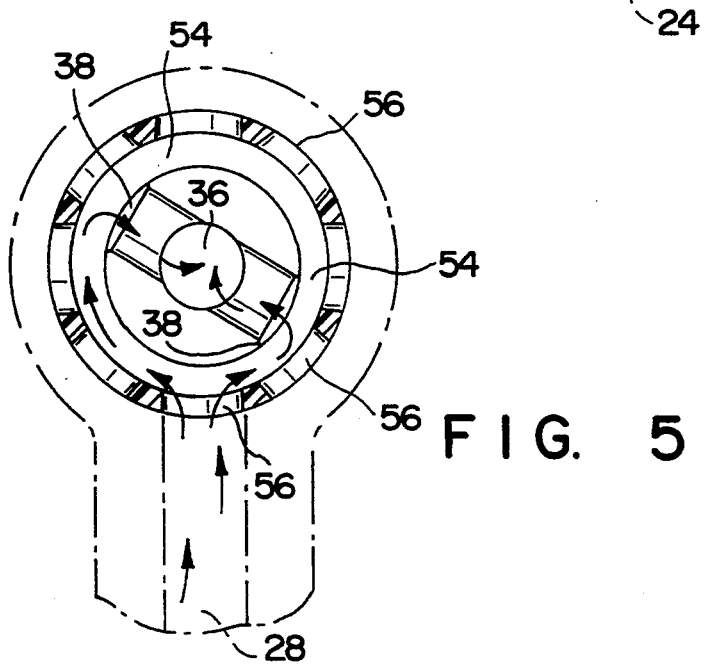
FIG. 5 is a side cut-away view of the device of FIG. 4 taken along the lines indicated.

A preferred embodiment of the invention is illustrated particularly in FIGS. 3 through 5. In this embodiment, a plurality of bearing sleeves are provided. A first bearing sleeve 42 is disposed concentric about the shaft and having fluid ports 56 defined therein in constant fluid communication with opening 38. Sealing devices 48 are provided on each end of bearing sleeve 42. An intermediate bearing sleeve 46 is provided adjacent sleeve 42. A second bearing sleeve 44 is provided adjacent sleeve 46 also having fluid ports 56 defined therein in constant fluid communication with opening 40. Again, sealing devices 48 are provided at each end of sleeve 44 so that at least one sealing device is provided between each of the bearings. Shaft 34 further comprises recessed portions 52 concentric therearound. Openings 38 and 40 are defined in the recessed passages 52. In this manner, with sleeves 42 and 44 disposed about openings 38 and 40 a concentric flow chamber 54 is defined between the bearing sleeve and shaft. This feature is particularly illustrated in FIG. 5, wherein fluid indicated by the pointed lines is illustrated travelling through fluid passage 28, through fluid port 56 of bearing sleeve 42, into concentric flow chamber 54 between the bearing sleeve and shaft 34 and then into openings 38 to travel longitudinally through longitudinal channel 36. Thus, in this embodiment, it should be understood that a sealing device 48 is provided on each side of sleeve 42 since fluid is free to pass through any of the ports 56 and must be prevented from leaking out of the interface between collar sections 20 and 26 and the ends of the collar sections. It should also be understood that, in the embodiment wherein a single bearing sleeve is utilized, means must be provided to prevent fluid from leaking out between the interface of the collar sections and from between the ends of the shaft and collar sections. This may be accomplished, for example, by having a sealing interface between the collar sections 20 and 26 or, by providing a sealing device concentric about the single bearing sleeve generally radially inward of the interface between sections 20 and 26, and also at the ends of the bearing sleeve.

In a preferred embodiment as particularly illustrated in FIGS. 3 and 4, the intermediate bearing sleeve 46 is disposed radially inward of the interface between collar sections 20 and 26. Sealing devices 48 are provided on each side of sleeve 46 to ensure that fluid from ports 56 cannot leak through the interface of the collar sections. Sealing devices 48 are also provided at the extreme ends of the bearing sleeve or sleeves. These sealing devices prevent liquid from leaking out of the interface between collar sections 20 and 26 and end caps 62 and 64. Thus, it should be understood that any combination of bearing sleeves and sealing devices may be utilized in the invention so long as they are appropriately configured to prevent fluid from leaking out of the device.

In order for sealing devices 48 to appropriately seal against collar sections 20 and 26, means must be provided for compressing the bearing sleeves and O-rings. In a preferred embodiment, the compressing means comprises a removable end cap which is variably mated with shaft 34. In a preferred embodiment, end cap 62 is threadedly engaged with shaft 34. An opposite end cap 64 is provided fixed to the shaft 34. Thus, it should be understood that as end cap 62 is screwed into shaft 34, end cap 62 compresses together the bearing sleeves and sealing devices.

Sealing devices 48 may preferably comprise conventional O-rings formed of resilient material. It is not necessary that sealing devices 48 be separate components, such as the removable end cap. In another embodiment, sealing devices 48 may comprise resilient gaskets or the like which are in some manner adhered to the ends of the bearing sleeves. However, removable O-rings are preferred for ease of replacement and maintenance.

Figure 7:
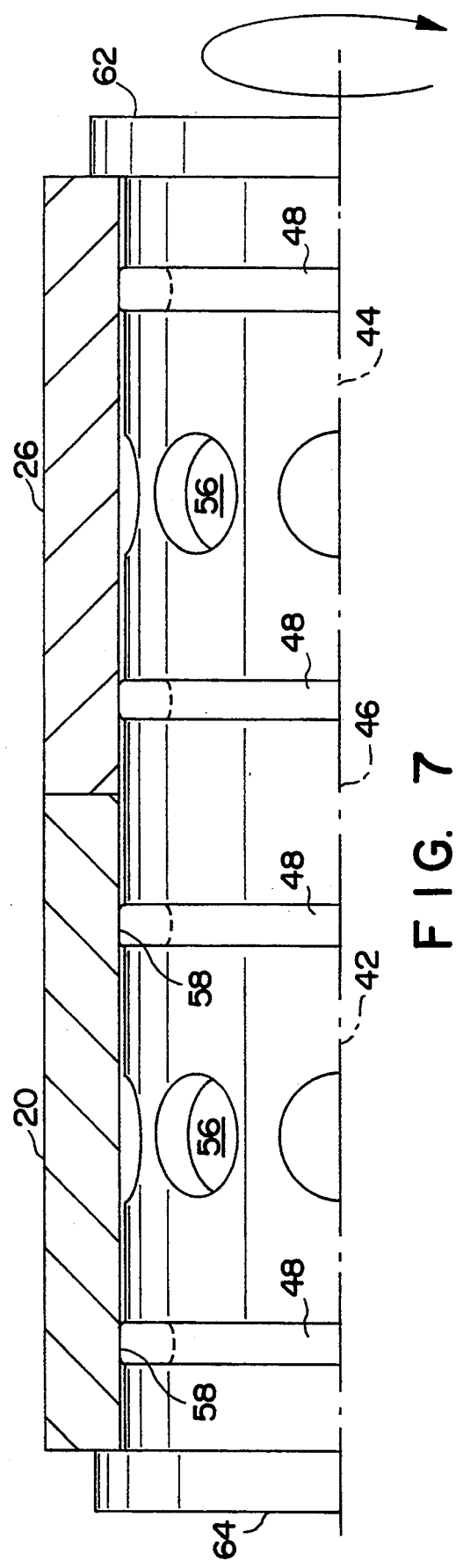
FIG. 7 is a similar view as in FIG. 6 showing the device in a compressed state so that the sealing devices assume their squeezed or compressed condition.

Referring particularly to FIGS. 6 and 7, sealing devices 48 comprise an unsqueezed or unstressed outer diameter which is slightly less than the outer diameter of the bearing sleeves. In this manner, upon compressing the bearing sleeves and O-rings, the O-rings are squeezed from a direction parallel to the longitudinal axis of the shaft thereby causing the sealing devices to radially expand and seal against sections 20 and 26. Since, in their unsqueezed condition, the O-rings sit radially inward of the bearing sleeves, the O-rings will not bind against the inner surface of collar sections 20 and 26 upon assembling the device. Also, the sealing devices are prevented from being nicked or cut by the cross-drilled holes 28 and 30 upon being slid therepast. FIG. 6 illustrates the bearing sleeves and sealing devices 48 in an uncompressed state. FIG. 7 illustrates the device in a compressed or squeezed condition wherein an end cap 62 is screwed onto shaft 34. It can be seen in FIG. 7 that O-rings 48 are axially compressed and thus expand radially outward sealing against sections 20 and 26.

Bearing sleeves 42, 46, 44 according to the invention can be formed of any conventional friction reducing material, such as a thermal plastic material containing teflon or the like. For example, an acetal resin impregnated with teflon may be employed. Any manner of bearing material may be utilized in this regard to reduce friction between the bearing sleeves and collar sections.

It will be apparent to those skilled in the art that various modifications and variations can be made in the apparatus and method of the present invention without departing from the scope or spirit of the invention. For example, various arrangements of sealing devices and bearing sleeves may be employed in the present device to achieve the results taught herein. Thus, it is intended that the present invention cover the modifications and variations of this invention provided they come within the scope of the appended claims and their equivalents.

What is claimed is:

1. A device for conducting fluid between variably positionable pipe members, said device comprising:
 a first member having an inlet portion matable with a first pipe member, said first member having a collar section and a fluid passage defined between said inlet portion and said collar section;
 a second member having an outlet portion matable with a second pipe member, said second member having a collar section and a fluid passage defined between said collar section and said outlet, said first and second member collar sections disposed relatively adjacent each other about a common rotational axis;
 a shaft disposed through said collar sections, said collar sections being independently rotatable relative each other about said shaft, said shaft defining a longitudinal channel therethrough and having a first opening into said longitudinal channel, and a second opening into said longitudinal channel;
 at least one bearing sleeve concentric about said shaft, said bearing sleeve having ports defined therethrough so that said fluid passages are in fluid communication with said longitudinal channel through said bearing sleeve;
 sealing devices disposed concentric about said shaft; and
 means for compressing together said bearing sleeve and said sealing devices thereby causing said sealing devices to seal against said collar sections, wherein a continuous fluid path is defined through said first member, said shaft, and said second member regardless of the degree of rotation of said first and second members about said shaft.

2. The device as in claim 1, wherein said first member inlet portion is disposed substantially perpendicular to said first member collar section, and said second member outlet portion is disposed substantially perpendicular to said second member collar section.

3. The device as in claim 2, wherein said inlet and outlet portions are formed integral with said first and second collar sections respectively, said fluid passages comprising cross-drilled holes between said inlet and outlet portions and said collar sections.

4. The device as in claim 1, wherein said shaft comprises concentric recessed portions defined therearound, said first and second openings defined in said recessed portions, wherein concentric flow chambers are defined between said recessed portions and said bearing sleeve.

5. The device as in claim 4, wherein said bearing sleeve comprises circumferential fluid ports defined therein, said ports spaced apart so that said first member fluid passage is in constant fluid communication with said second member fluid passage regardless of the degree of rotation of said first and second members about said shaft.

6. The device as in claim 5, further comprising a plurality of said bearing sleeves including a first bearing sleeve concentric about said first concentric portion and having said fluid ports defined therein, and a second bearing sleeve concentric about said second concentric portion having said fluid ports defined therein, and an additional said sealing device disposed between said bearing sleeves.

7. The device as in claim 1, wherein said sealing devices comprise resilient O-rings.

8. The device as in claim 7, wherein said O-rings have an unsqueezed outer diameter slightly less than the outer diameter of said bearing sleeves, whereby upon compressing said bearing sleeves and said O-rings, said O-rings assume a squeezed outer diameter greater than that of said bearing sleeves thereby sealing against said collar sections.

9. The device as in claim 8, wherein said O-rings further comprise an inner diameter slightly greater than the diameter of said shaft so as to slide onto said shaft in an unstretched state.

10. The device as in claim 1, wherein said compressing means comprises an endcap threadedly mated with said shaft, said endcap compressing said bearing sleeves and said sealing devices as it is screwed onto said shaft.

11. The device as in claim 10, further comprising a second endcap fixedly secured to said shaft opposite said threadedly mated endcap.

12. The device as in claim 11, wherein said second endcap is formed integral with said shaft.

13. The device as in claim 1, wherein said bearing sleeves comprise a friction reducing material.

14. The device as in claim 13, wherein said bearing sleeves are formed of a thermal plastic material containing teflon.

15. A fluid conducting joint connectable between variably positional fluid conducting members, said joint comprising:
inlet and outlet halves rotatable relative each other about a common fluid conducting shaft passing between said inlet and outlet halves;
at least two bearing sleeves concentric about said shaft between said shaft and said inlet and outlet halves, said bearing sleeves further comprising fluid ports defined therethrough so that fluid can continuously flow from said inlet, through one of said bearing sleeves into said shaft, out of said shaft through the other of said bearing sleeves, and out said outlet;
resilient sealing members disposed concentric about said shaft and relative said bearing sleeves so as to prevent fluid leakage from said device; and
a removable end cap for securing said shaft within said inlet and outlet halves, said end cap squeezing said sealing members and said bearing sleeves causing said sealing members to axially compress and radially expand to seal against said inlet and outlet halves.

16. The joint as in claim 15, wherein said sealing members have an uncompressed outer diameter less than the outer diameter of said bearing sleeves so that said sealing members do not bind against said inlet and outlet halves as said shaft is positioned therethrough.

17. The joint as in claim 16, wherein said sealing members have an inner diameter greater than the outer diameter of said shaft so that said sealing members are positionable about said shaft in an unstressed state.

18. The joint as in claim 15, further comprising an additional said bearing sleeve disposed concentric about said shaft intermediate said two bearing sleeves and generally between the interface of said inlet and outlet halves and said shaft, said sealing members disposed at least at each end of said intermediate bearing sleeve.

19. The joint as in claim 15, wherein said bearing sleeves comprise a friction reducing material.

20. The joint as in claim 15, further comprising an additional endcap fixedly secured to said shaft opposite said removable end cap.

21. A rinsing assembly, comprising:
at least two articulable fluid conducting arm members, one of said arm members being connectable to a fluid source;
a swivel joint connecting said articulable arm members, said swivel joint further comprising:
an inlet member matable with one of said arm members, said inlet member defining a fluid passage from said arm member to an inlet member collar section;
an outlet member matable with the other of said arm members, said outlet member defining a fluid passage from said arm member to an outlet member collar section;
a shaft member disposed through said inlet and outlet member collar sections so that said collar sections rotate about the longitudinal axis of said shaft, said shaft defining a liquid channel therethrough and further defining inlet and outlet ports into said liquid channel;
at least one bearing sleeve concentric about said shaft so that said collar sections rotate about said bearing sleeve during operation;
resilient sealing rings disposed about said shaft and adjacent said bearing sleeve for preventing leakage of fluid from said swivel joint; and
compression means for axially compressing said sealing rings and said bearing sleeve together so that said sealing rings radially expand sealing against said collar sections.

22. The rinsing assembly as in claim 21, further comprising a plurality of said articulable arm members, said arm members being connected with respective said swivel joints.

23. The rinsing assembly as in claim 21, wherein said compression means comprises an end cap having a threaded male member matable with a threaded female member defined in one end of said shaft.

24. The rinsing assembly as in claim 21, wherein said swivel joint further comprises a plurality of said bearing sleeves with at least one said sealing ring disposed between adjacent said bearing sleeves.

25. The rinsing assembly as in claim 24, comprising a first end bearing sleeve disposed generally between said inlet member fluid passage and said shaft inlet port, and a second end bearing sleeve disposed generally between said outlet member fluid passage and said shaft outlet port, said end bearing sleeves having holes defined therethrough so that said fluid passages are in continuous fluid communication with said respective shaft ports.

26. The rinsing assembly as in claim 25, including an additional said bearing sleeve intermediate said end bearing sleeves.

27. A swivel joint for connecting articulable fluid conducting arm members of a plumbing assembly, said swivel joint comprising:

an inlet member matable with a first said arm member, said inlet member defining an inlet fluid passage from said respective arm member to an inlet member collar section;

an outlet member matable with a second said arm member, said outlet member defining an outlet fluid passage from said respective arm member to an outlet member collar section;

a shaft member disposed through said inlet and outlet member collar sections so that said collar sections rotate about the longitudinal axis of said shaft, said shaft defining a liquid channel therethrough and further defining inlet and outlet ports into said liquid channel, said inlet and outlet ports being in fluid communication with said inlet and outlet fluid passages respectively;

at least one bearing sleeve concentric about said shaft so that during operation said collar sections are rotatable relative each other about said bearing sleeve;

resilient sealing rings disposed about said shaft and adjacent said bearing sleeve for preventing leakage of fluid from said swivel joint; and compression means for axially compressing said sealing rings and said bearing sleeve together so that said sealing rings radially expand sealing against said collar sections.

28. The swivel joint as in claim 27, wherein said compression means comprises an end cap having a threaded male member matable with a threaded female member defined in one end of said shaft.

29. The swivel joint as in claim 27, further comprising a plurality of said bearing sleeves with at least one said sealing ring disposed between adjacent said bearing sleeves.

30. The swivel joint as in claim 29, comprising a first end bearing sleeve disposed generally between said inlet fluid passage and said shaft inlet port, and a second end bearing sleeve disposed generally between said outlet fluid passage and said shaft outlet port, said end bearing sleeves having holes defined therethrough so that said fluid passages are in continuous fluid communication with said respective shaft ports.

31. The swivel joint as in claim 30, including an additional said bearing sleeve intermediate said end bearing sleeves.

32. The swivel joint as in claim 27, wherein said bearing sleeves comprise a friction reducing material impregnated therein.

33. The swivel joint as in claim 27, wherein said bearing sleeves comprise a friction reducing material formed homogeneous therewith.

* * * * *